Figure 1:
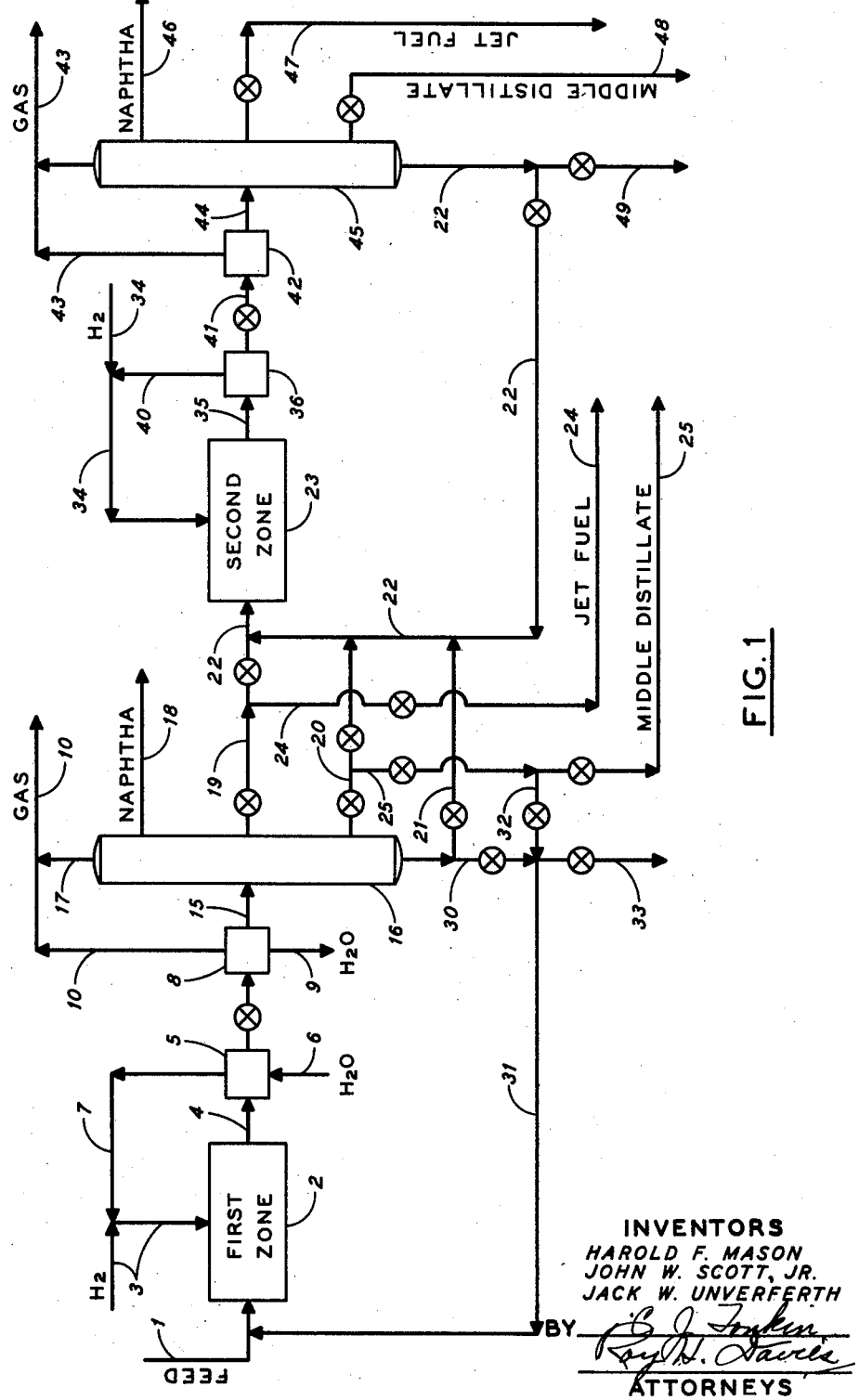

United States Patent Office 3,166,489
Patented Jan. 19, 1965

3,166,489
HYDROCRACKING PROCESS
Harold F. Mason, Berkeley, John W. Scott, Jr., Ross, and Jack W. Unverferth, Walnut Creek, Calif., assignors to California Research Corporation, San Francisco, Calif., a corporation of Delaware
Filed Sept. 21, 1961, Ser. No. 139,717
6 Claims. (Cl. 208—57)

INTRODUCTION

This invention relates to a hydrocarbon conversion process, and, more particularly, to a hydrocarbon conversion process for converting distillates and residua to various valuable products, and, still more particularly, to a catalytic hydrocracking process wherein high conversions are obtainable for sustained periods of on-stream operation without intolerable increases in catalyst fouling rate, and wherein the catalyst is maintained in a regenerable condition during the entire on-stream period.

PRIOR ART PROBLEMS AND SOLUTIONS

It has been well known heretofore that, although catalytic hydrocracking is recognized as one of the most useful processes available to modern refiners, at least two main counteracting influences have been at work to reduce the economic attractiveness of this type of hydrocracking. These influences, which are interrelated, are: (1) the inability of most modern hydrocracking processes to be operated for sustained on-stream periods under reasonable conditions without the onset of intolerable catalyst fouling rates, and (2) the inability of most modern catalytic hydrocracking catalysts to be satisfactorily regenerated.

It is well known that the current costs of hydrocracking catalysts are extremely high, and that these costs form a very substantial portion, not only of the original plant investment, but of the amounts necessary to maintain the plant in operation when it is necessary to replace with expensive fresh catalyst from time to time used catalyst that is not satisfactorily regenerable.

While many literature references exist that purport to disclose various methods for regenerating hydrocracking catalysts, it is significant to note that nearly any hydrocracking catalyst may be partially regenerated by conventional methods, but that such partial regeneration is frequently a means for restoring only a few percent of the fresh catalyst activity that has been lost. For example, if a catalyst has been reduced in activity from 100% to 25%, regeneration that purports to double the activity of the spent catalyst in reality merely produces a catalyst having only 50% of the fresh catalyst activity.

The prior art has attempted to meet the problem of restoring activity to expensive hydrocracking catalysts that have become spent in service in a number of ways. For example, conventional regeneration in an oxygen-containing stream, whereby carbon and other contaminants are burned from the catalyst has been used. Various chemical reactivation means have been used. Various types of catalyst rejuvenation techniques, wherein a change in the chemical structure of the catalyst itself takes place, rather than a mere physical change as in the case of regeneration, have been used. However, all of these efforts have left much to be desired, and to date the art has not produced a satisfactory technique for operating a hydrocracking process for long on-stream periods at reasonable operating conditions without intolerable catalyst fouling rates, while maintaining the catalyst in a regenerable condition, and for satisfactorily regenerating the catalyst at the conclusion of each on-stream period, i.e., for re-imparting to the catalyst substantially all of its fresh activity.

OBJECTS

In view of the foregoing, it is a primary object of the present invention to provide methods for operating a hydrocracking process for long on-stream periods under reasonable operating conditions without intolerable increases in catalyst fouling rates while maintaining the hydrocracking catalyst in a regenerable condition. It is a further object of the present invention to provide means for regenerating hydrocracking catalysts that result in re-imparting to such catalysts at least substantially all of their fresh activity.

THE PRESENT INVENTION

In accordance with the present invention, it has been discovered that hydrocracking catalysts employing at least one metal or metal compound on a cracking support undergo a metal crystal growth phenomenon while on-stream in hydrocracking service and that there is some relationship between this metal crystal growth phenomenon and the length of time that the catalyst may be maintained on-stream in a subsequently-regenerable condition. It is not our purpose to explain in detail the various theories in support of this relationship; it will suffice for us to point out means whereby this crystal growth may be suppressed, with a remarkable consequent extension of the on-stream periods that can be attained while maintaining the catalyst in a regenerable condition, and with a remarkable consequent amenability of the catalyst to subsequent regeneration to an activity approaching or exceeding its original fresh activity.

This crystal growth phenomenon and the means provided herewith to combat it are set forth and exemplified in more detail below. Generally speaking, however, it may be said that the advantageous results as aforesaid may be obtained in a hydrocarbon conversion process, including at least one hydrocracking step, for converting an aromatics-containing hydrocarbon stock, by the method which comprises correlating the aromatics content of the feed to said hydrocracking step, the nitrogen content of the feed to said hydrocracking step, the space velocity of the feed to said hydrocracking step, and the hydrogen partial pressure in said hydrocracking step, so that substantially all of the hydrogen consumed in said hydrocracking step is consumed in hydrocracking reactions, and the amount of hydrogen consumed in saturating aromatics in said hydrocracking step is minimized. Further, in accordance with the present invention, it has been discovered that under appropriate conditions the aforesaid efficaceous results may be greatly facilitated by substantially saturating the polynuclear aromatics, i.e., aromatics having at least two fused aromatic rings, in the hydrocarbon stock prior to subjecting said stock to the hydrocracking operation. Still further in accordance with the present invention, it has been found that the aforesaid efficaceous results under certain conditions may be greatly facilitated by providing for the presence of nitrogen in the feed to the hydrocracking zone. The latter expedient is all the more remarkable because of the quite generally-held belief heretofore that nitrogen is one of the most severely deleterious materials that can be present in a hydrocracking feed stock.

In more detail, in accordance with the present invention, there is provided a process for converting an aromatics-containing hydrocarbon feed selected from the group consisting of hydrocarbon distillates boiling from about 500° to 1100° F. and hydrocarbon residua boiling above about 1050° F. which comprises contacting said feed in a hydrocracking zone with a catalyst comprising a hydrogenating-dehydrogenating component on an active, acid, cracking support at a temperature of from 450° to 900° F., a space velocity of from about 0.2 to 5.0, and a hydrogen partial pressure of at least 350 p.s.i.g., and maintaining said catalyst in a regenerable condition by correlating the aromatics content of said feed, the nitrogen content of said feed, said space velocity and said hydrogen partial pressure, so that substantially all of the hydrogen consumed in said hydrocracking zone is consumed in hydrocracking reactions and the amount of hydrogen consumed in saturating aromatics in said hydrocracking zone is minimized.

Upon reading the present specification, a man skilled in the art will have no difficulty in determining the various combinations of operating factors that will provide the proper correlation to give the novel results discussed herein. Generally speaking, he will operate a hydrocracking process pursuant to the present invention by selecting a desired combination of temperature, pressure and space velocity to provide a desired conversion with a given feed, and then, by an aromatics saturation step and/or nitrogen addition where necessary, will use a correlation between the nitrogen content and the aromatics content of the feed to the hydrocracking zone under consideration, that is directionally as indicated in the following examples:

| Vol. percent Aromatics | Vol. percent Polynuclear Aromatics | N, p.p.m. |
|---|---|---|
| 4 | 1 | 2 |
| 40 | 10 | 25 |
| 80 | 20 | 50 |

It will be understood that, because the objective of the present invention is the suppression of aromatics, hydrogenation in the presence of the hydrocracking catalyst, the entire correlation must include consideration of pressure, temperature and space velocity. Generally speaking, aromatics saturation will be less at lower pressures.

Still more particularly in accordance with the present invention, following an extended on-stream period of at least 750 hours conducted as aforesaid, said hydrocracking catalyst is regenerated to at least substantially all of its original activity and is placed back in service for subsequent cycles of extended on-stream periods of at least 750 hours, followed by regeneration.

The present invention is concerned only with aromatics-containing hydrocracking feeds, containing from about 1 to 100 volume percent aromatics. It has been found that saturation of aromatics in the presence of the hydrocracking catalyst causes, or at least invariably appears to be concurrent with, the deleterious growth of metal crystallites on the hydrocracking catalyst. It has also been found that this crystallite growth not only adversely affects process operation during the on-stream period, but either causes, or at least is concurrent with, the inability of the hydrocracking catalyst to have imparted to it upon subsequent regeneration an adequate amount of its fresh activity. It has also been found that, while the aforesaid statements are true, large amounts of certain aromatics may be present in the feed to the hydrocracking zone and good results nevertheless may be obtained without doing violence to the aforesaid theories, so long as the amount of hydrogen consumed in the hydrocracking zone in saturating aromatics is minimized. This result will usually be obtained with more ease even when large amounts of aromatics are present so long as they are not polynuclear aromatics; however, this result is extremely difficult or impossible to achieve when polynuclear aromatics are present and therefore a highly preferred manner of practicing the present invention is to saturate polynuclear aromatics in the feed prior to subjecting the feed to a hydrocracking operation, to reduce the polynuclear aromatics content of the feed at least down to tetralin-type structures, to an extent that the compounds remaining that have at least two fused rings are reduced at least down to 5 volume percent, and more preferably to substantially 0 volume percent.

THE DRAWINGS

Figure 2:
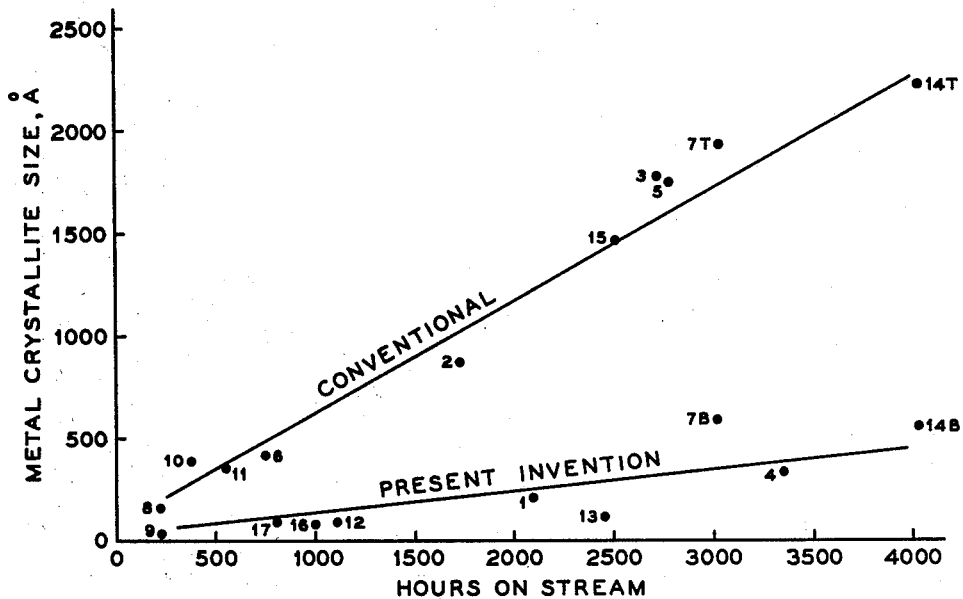
Figure 3:
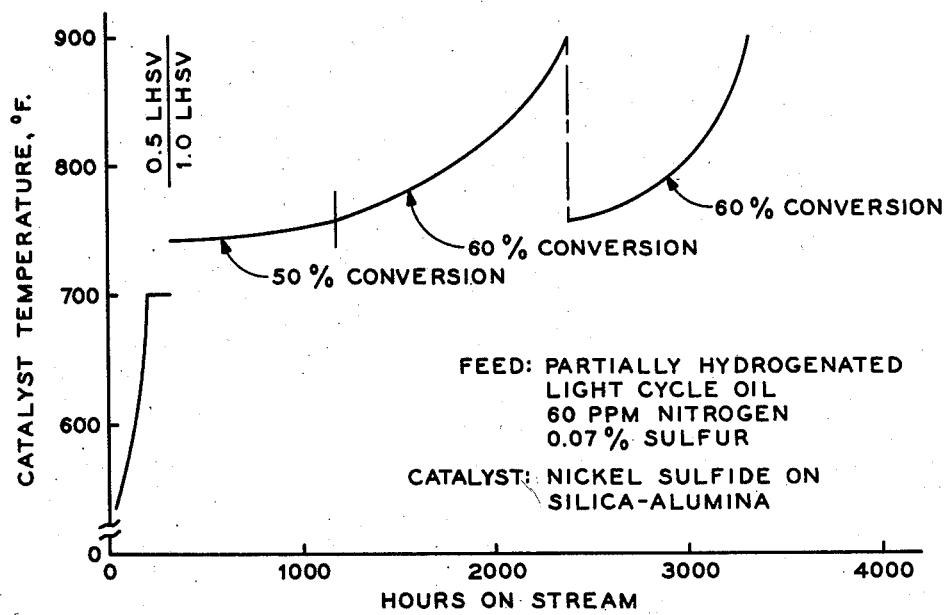

The novel features of the present invention are set forth with particularity in the appended drawings. The invention will best be understood and additional objectives of the invention will be apparent from the following description of an exemplary process for producing middle distillates, gasoline and other products from petroleum distillate and residual feeds in a hydrocracking operation while maintaining the hydrocracking catalyst in a regenerable condition for extended on-stream periods, and for regenerating said catalyst to impart to it at least substantially all of its fresh catalyst activity, when read in connection with the accompanying drawings, in which:

FIG. 1 is a flow diagram illustrating a preferred arrangement of process units and flow paths for use in practicing the present invention;

FIG. 2 is a graphical representation of hydrocracking catalyst metal crystallite sizes at various times after a catalyst has been on-stream in hydrocracking service with various hydrocarbon feeds and various hydrocarbon feed contaminants; and FIG. 3 is a graphical representation of operating temperature versus time on-stream when hydrocracking a particular hydrocarbon feed containing 60 p.p.m. nitrogen and 0.07% sulfur, at relatively constant conversion.

OVERALL PROCESS

Referring now to FIG. 1, there shown is an exemplary overall process flow diagram suitable for carrying out the process of the present invention. While a two-stage process, i.e., one with a hydrocracking zone and at least one prior feed treating zone, is not indispensible to the present invention, in most situations a two-stage process will be used, and therefore the invention is illustrated below in terms of two-stage embodiments. The process flow of FIG. 1 is especially suitable where a non-acidic or only weakly acidic hydrocracking catalyst, having denitrification, hydrocracking and aromatics saturation activity, is used in the first zone, and an acidic-type hydrocracking catalyst is used in the second zone.

The hydrocarbon feed to be converted is passed through line 1 into first zone, 2, where it may be treated as hereinafter discussed. First zone, 2, may be a hydrocracking zone, a hydrofining zone, an aromatics pre-saturation zone, or a combination of these types of zones, as necessary to comply with the requirements of the present invention. The following detailed description relates to an embodiment wherein first zone, 2, is a hydrocracking zone operated to produce hydrocracking, denitrification and some aromatics saturation. The feed may be any petroleum distillate boiling between 300° and 1100° F. or any petroleum residuum boiling above 1050° F., or mixtures thereof. Satisfactory feed stocks are discussed below. Hydrogen for hydrocracking, denitrification and/or aromatics saturation reactions in zone 2 is supplied to that zone through line 3. Any conversion products from zone 2 that it is desired to remove from the system may be withdrawn through line 4 and they may be contacted in high pressure separator 5 with water supplied through line 6, and a hydrogen stream may be recycled from high pressure separator 5 through line 7. From high pressure separator 5 any such conversion products may be passed to low pressure separator 8 from which water may be removed through line 9 and from which a gas stream may be separated through line 10, the remainder of the conversion products being passed through line 15 to distillation column 16.

From distillation column 16 a gas stream may be withdrawn through line 17, and a product stream may be removed from the system through line 18, in the event that a product is recovered from the effluent from first zone 2. A stream may be passed from column 16 through at least one of lines 19, 20 and 21 to line 22 and thence to second conversion zone 23. Any higher boiling products from the operation of first zone 2 may be withdrawn through lines 24 and 25, respectively. A stream may be recycled through lines 30 and 31 and may be a bottoms stream remaining after streams are withdrawn from column 16 through lines 19 and/or 20 and/or 21 and if all but one of lines 19, 20 and 21 are closed, may include the streams that would have passed through the closed lines 19 and/or 20 and/or 21. For further flexibility, a stream may be recycled through line 32, for example, where it is desired to accomplish a recycle operation with line 30 closed. An end product stream may be removed through line 33 if desired.

The feed entering second zone 23 through line 22 is converted there in the presence of hydrogen supplied through line 34. Second zone 23 is discussed in detail below. The effluent from second conversion zone 23 is withdrawn through line 35 and is passed to high pressure separator 36 from which a hydrogen stream is recycled through line 40. The conversion products from high pressure separator 36 are passed through line 41 to low pressure separator 42 from which a gas stream is removed through line 43. The conversion products remaining in low pressure separator 42 are passed through line 44 to distillation column 45. From distillation column 45 a naphtha stream may be withdrawn from the system through line 46 for use as a product or for further processing, for example, by reforming. A jet fuel stream may be withdrawn through line 47 and a middle distillate stream may be withdrawn through line 48 or either or both of these streams may be combined with the bottoms stream that may be recycled through line 22. An end bottoms stream may be withdrawn through line 49 and, if desired, may be passed to a catalytic cracking zone for further conversion.

FEED TO FIRST ZONE

As discussed above in connection with the detailed description of FIG. 1, the feed to the first zone may be any petroleum distillate boiling from 300° to 1100° F., or any petroleum residuum boiling above 1050° F., or mixtures thereof, which contain aromatic compounds, particularly those which contain aromatic compounds having at least 9 carbon atoms in the molecule. Representative feeds include heavy naphthas boiling in a range from about 300° to 475° F., kerosenes, light and heavy gas oils, light and heavy coker distillates, light and heavy catalytic cycle oils, conventional 650° to 1050° F. FCC feed stocks, and the like. Various of these feeds are of straight run origin, while others are recovered as distillate product fractions from various processing units, such as cokers or other cracking units of the thermal or catalytic variety. Other appropriate feed stocks comprise the effluent portions boiling above about 300° to 325° F. as obtained from a catalytic reforming unit, such stocks being conventionally produced by passing straight run, thermally cracked and/or catalytically cracked naphthas, along with added hydrogen, over a platinum-on-alumina or a molybdena-alumina catalyst under reforming conditions. Still other suitable feeds include raffinates, deasphalted residua, and concentrates rich in aromatic hydrocarbons, as obtained by the extraction of various hydrocarbon fractions with sulfur dioxide, furfural, mixtures of various polyethylene and polypropylene glycols or the like.

While the invention finds particular utility in connection with the processing of distillate fractions derived either directly from crude petroleum or from process units working with petroleum hydrocarbons, it is also within the scope of the present invention to employ distillate feed stocks derived from other sources, such as shale, gilsonite, coal, or the like.

When the first zone is a hydrocracking zone using a non-acidic or only weakly acidic hydrocarcking catalyst, and no aromatics saturation step is included in the process, it is preferred, from a product standpoint, that the feeds to the process have an initial boiling point of 500° F. or above because it is only with such feeds that middle distillates, including jet fuels, can be produced in the first zone which are highly naphthenic, low in aromatics (therefore having high smoke points), and low in normal paraffins (therefore having low freezing points). Where the feed has an initial boiling point above 500° F., it may be converted in the first conversion zone directly to a synthetic material (i.e., one boiling below the feed initial boiling point), which is a preferred jet fuel having a high naphthene content, low normal paraffin content and therefore low freeze point, and low aromatics content and therefore relatively high smoke point. It has been found that feeds having lower initial boiling points, for example, around 400° F., tend in the presence of a non-acidic or only weakly acidic hydrocracking catalyst to produce a product boiling in the jet fuel range with an unacceptable freeze point. Such non-synthetic product also tends to have a high pour point.

The nitrogen content of the feed to the first zone generally is dependent upon the nitrogen content requirements of the feed to the second zone. The nitrogen content of the feed to the second zone generally should be below 1000 parts per million, preferably below 100 parts per million, and still more preferably between 2 and 10 parts per million. The nitrogen content of the feed to the first zone can be anything consistent with these requirements. It should be noted in connection with high nitrogen-content feeds that, even though the first zone could be operated to reduce the nitrogen content to some minimum level without exceeding the permissible limit of cracking severity, it may be found very desirable not to accomplish this much denitrification, but rather to accomplish some lesser amount and permit the excess nitrogen to pass through to the second zone. This method of operation will require an increase in pressure in the second zone; however, particularly with heavy feeds, it will frequently permit a much greater decrease in pressure in the first zone. A most desirable objective is to operate both of the zones at substantially the same pressure. Because pressure is nitrogen-dependent, this type of operation may be facilitated by controlling the amount of nitrogen passing to the second zone and, where necessary, deliberately permitting nitrogen to pass to that zone. This method of handling the nitrogen contents of the feeds to the two zones is applicable even in the absence of the interstage fractionation zone shown in the embodiment illustrated in FIG. 1. Where the first zone is used for hydrocracking, the hydrocracking catalyst generally has a high degree of denitrification activity, and accordingly where nitrogen-containing feeds are supplied to the process the first zone will accomplish a substantial amount of denitrification concurrently with the hydrocracking in that zone.

FIRST ZONE, GENERAL

As previously discussed, the first zone may be a hydrocracking zone, a hydrofining zone, an aromatics presaturation zone, or a combination of these types of zones, as necessary to comply with the requirements of the process of the present invention. The first zone may be one unit, as shown on the drawing, or may be a series of zones, each adapted to carry out a particular function, such as hydrocracking, denitrification, or aromatics saturation. Preferred uses for said first zone are: (1) hydrocracking with concurrent denitrification, and (2) hydrofining followed by or concurrent with aromatics presaturation.

FIRST ZONE, WHEN USED FOR HYDROCRACKING WITH CONCURRENT DENITRIFICATION

A. General

When used for hydrocracking, the first zone may be used either: (a) with a non-acidic or only weakly acidic-type catalyst, which will result in an increased production of middle distillate boiling range products from the first zone compared with gasoline boiling range products, or (b) with an acidic-type catalyst, which will result in an increased production of gasoline boiling range products from the first zone compared with middle distillate boiling range products.

With either type catalyst in the first zone, the hydrocracking reaction may be conducted in that zone at combinations of conditions, selected from within the following ranges, that will produce the desired degree of hydrocracking: temperature about 550° to 900° F., preferably 650° to 850° F.; hydrogen partial pressure of 500 to 3000 p.s.i.g., more preferably 1000 to 2500 p.s.i.g.; and liquid hourly space velocity of about 0.1 to 3.0, preferably 0.4 to 1.0. The hydrogen flow to the first zone under hydrocracking conditions may be at least 1000 s.c.f. per barrel of feed and preferably 1500 to 6000 s.c.f. per barrel of feed. The hydrogen partial pressure, of course, will depend upon a number of factors, including type of feed stock and nitrogen content thereof, degree of denitrification required, etc.; however, in general, a hydrogen partial pressure of 1000 to 1500 p.s.i.g. is highly desirable if practicable in any given instance. Further, it is desirable that the hydrogen partial pressure in both the first and second zones be maintained at substantially the same level.

Hydrocracking in the first zone facilitates denitrification because, upon the breaking of carbon-to-carbon bonds, nitrogen is more easily removed. At higher levels of cracking conversion, the nitrogen is more easily removed than at lower levels. At higher levels of cracking conversion, higher pressures are required to prevent rapid fouling and deactivation of the catalyst.

The nitrogen compounds tend to concentrate in the heavier portions of the feed; accordingly, such heavier portions as such are more difficult to denitrify. However, it will be noted from the foregoing that such heavier portions also are easier to crack in the first zone. Accordingly, the first zone, where the first zone is used for hydrocracking, operates to reduce the workload on the hydrocracking catalyst in the second zone and also operates to reduce the nitrogen content of the feed to the second zone, which is a desirable objective except to the extent that nitrogen is desirable in the feed to the second zone, as discussed below.

Particularly with heavy feeds, it may be desirable to operate the first zone in a counterflow manner, that is, with the hydrogen being passed through the first zone in a direction counter to the direction of the feed. Another desirable method of operation may be to operate the first zone as two reaction systems in series with intermediate stripping of $H_2S$ and $NH_3$. These types of operation will improve the hydrodenitrification efficiency of the zone.

B. *First zone, when used for denitrification and concurrent hydrocracking to produce large amount of middle distillates*

Hydrocracking may be accomplished in the first zone to produce large amounts of high quality middle distillate product that has a low sulfur content, that has a high degree of saturation and therefore good burning qualities, and that is stable to oxidation and storage, by the methods set forth below. The appropriate portions of the first stage product have utility as superior heating oils, diesel fuels and jet fuels.

In the first zone, when that zone is used for hydrocracking to produce large amounts of middle distillates, the preferred hydrocracking conditions are those that are only severe enough to convert naphthenes and aromatics, but not severe enough to crack substantial quantities of paraffins. A desired objective is to crack only the naphthenes boiling above the middle distillate range and to conserve naphthenes boiling in the middle distillate boiling range. This objective may be achieved, and a highly naphthenic first zone product in the middle distillate range may be obtained which has a low freeze point, a low pour point and a high cetane number, a good heating value and/or a comparatively high smoke point.

The catalyst in the first zone where a large middle distillate production is desired may be a hydrocracking catalyst that is capable of converting the feed at a per-pass conversion of from 10 to 50 volume percent of said feed, under the operating conditions in the first zone, in large part, to reaction products in the synthetic middle distillate boiling range, i.e., products boiling not only in the middle distillate range, but also below the initial boiling point of the feed.

It has been found that a catalyst capable of accomplishing the foregoing conversion may comprise a hydrogenating-dehydrogenating component alone or on a support comprising at least one metal, metal oxide, metal sulfide, metal selenide, or combinations thereof, preferably oxides and sulfides of Groups VI and VIII of the Periodic Table. The most preferred catalyst will comprise combinations of sulfides of cobalt and/or nickel with sulfides of molybdenum and/or tungsten. The catalyst generally will comprise the aforesaid hydrogenating-dehydrogenating component disposed on a support. Where a support is used, good results may be obtained if the support is non-acidic or only weakly acidic. Exemplary supports include silica, charcoal, kieselguhr, titanium, zirconia, bauxite and alumina, with alumina being an especially preferred support. While alumina is sometimes considered to be weakly acidic, its acidity is so low compared with silica-alumina that it may be considered to be non-acidic, particularly in view of the markedly different product distribution it provides as compared with a silica-alumina support. Less satisfactory supports, when the production of more middle distillates and less gasoline in the first zone is desired, are acidic mixed oxides, for example, silica-magnesia, alumina-boria, or silica-alumina.

An outstanding composite that may be used in the first zone when a large middle distillate production is desired is a sulfided catalyst comprising 4 to 10 weight percent nickel, as metal, and 15.5 to 30 weight percent molybdenum, as metal, on a substantially non-acidic base consisting essentially of alumina. The aforesaid catalyst combination results in a significantly different product distribution from that obtained with acidic-type hydrocracking catalysts; it does not exhibit the high cracking activity of these catalysts even at high temperatures and, accordingly, the maximum yield of products is in a higher molecular weight range than in the case of an acidic-type hydrocracking catalyst. Further, the catalyst combination tends to give a much wider boiling range spectrum of products than does an acidic-type hydrocracking catalyst. Still further, the maximum total yield of synthetic products, i. e., those products boiling below the initial boiling point of the feed, occurs in a molecular weight range adjacent to and immediately below the initial boiling point of the feed, whereas, in the case of an acidic-type hydrocracking catalyst, this maximum yield occurs in a lower boiling range. Clearly, of the multitude of possible compounds in a given feed, many of these compounds must undergo different cracking and other reactions in the presence of the aforesaid non-acidic type cracking catalyst than they do in the presence of an acidic-type hydrocracking catalyst; otherwise, the substantial differences in yield structure obtained with the two types of catalyst could not be accounted for.

A corollary feature of the use of the aforesaid non-acidic or substantially non-acidic hydrocracking catalyst is that such a catalyst generally has excellent denitrification activity, and where large amounts of nitrogen are present in the feed to the process, the catalyst efficiently converts substantial quantities thereof in the reaction zone to ammonia which may be removed from the reaction zone effluent by conventional procedures, such as the water scrubbing illustrated in FIG. 1 hereof. As discussed under "Feed to First Zone" above, the nitrogen content of the feed to the first zone is dependent upon the nitrogen content requirements of the feed to the second zone.

C. *First zone, when used for denitrification and concurrent hydrocracking to produce large amounts of gasoline*

The hydrogenating-dehydrogenating component in this situation generally may be the same as for the first zone catalyst when the first zone is used to produce large amounts of middle distillates. However, the catalyst support generally should be more acidic, and may be a mixed oxide such as silica-alumina, silica-magnesia or alumina-boria. The entire catalyst composite discussed herein in connection with the second zone is very desirable in this situation.

INTERSTAGE FRACTIONATION AND CUT POINTS, WHEN THE FIRST ZONE IS USED FOR HYDROCRACKING WITH A NON-ACIDIC OR ONLY WEAKLY ACIDIC CATALYST

As indicated in FIG. 1, an interstage fractionation zone or distillation column 16 may be operated to separate the effluent from the first conversion zone into various streams, including a naphtha stream which may be removed from the system through line 18, and higher boiling streams which are maintained in the system. The following discussion will indicate variations in process operation where the first zone is used for hydrocracking with a non-acidic or only weakly acidic catalyst, as influenced by the various boiling points at which cuts may be made on column 16 and the resulting fractions subsequently manipulated, whether by being withdrawn as product, passed to the second zone, or recycled to the first zone.

(1) So long as at least a naphtha fraction boiling below 400° F. is withdrawn from the system as a product through line 18, all remaining material from column 16 that boils above 320° F. may be passed to the second zone.

(2) Instead of passing to the second zone all remaining material boiling above 320° F., the material passed to the second zone may be limited to material boiling above 500° F.

(3) The process may be operated as in (1) above, except that instead of passing all of the material boiling above 320° F. to the second zone, at least a portion of that material is recycled to the first zone.

(4) The process may be operated as in (1) above, with the additional feature of recycling to the second zone at least a portion of the effluent therefrom that boils above the initial boiling point of the feed thereto.

(5) The process may be operated as in (1) above, except that at least a portion of the materials from the interstage fractionation zone boiling above 320° F. is recycled to the first zone, and with the additional feature of recycling to the second zone at least a portion of the effluent therefrom that boils above the initial boiling point of the feed thereto.

(6) The process may be operated as in (3) above, but with the portion of the material recycled from the interstage fractionation zone to the first zone being limited to material boiling above about 500° F.

(7) The process may be operated as in (4) above, but with the material passed from the interstage fractionation zone to the second zone being limited to material boiling above about 500° F.

(8) The process may be operated as in (5) above, but with the material recycled from the interstage fractionation zone to the first zone being limited to material boiling above about 500° F.

FIRST ZONE, WHEN USED FOR HYDROFINING FOLLOWED BY AROMATICS SATURATION

When a hydrocarbon feed is first hydrofined to effect removal of nitrogen- and sulfur-containing impurities and is then passed, along with hydrogen, over a catalyst incorporating hydrogenating and active cracking components, it is found that the aromatics compounds present in the feed tend to be converted in the hydrocracking zone to primary products having but one, two, and, in some cases, three fewer carbon atoms than the corresponding precursor compounds. Thus, to take a typical example wherein a heavy naphtha boiling over a range of from about 360° to 450° F. and containing approximately 40% aromatics, is subjected to a sequence of hydrofining and hydrocracking steps, it is found that the synthetic product fractions boiling below about 360° F. are rich in $C_9$ aromatic components and contain relatively smaller amounts of compounds such as benzene, toluene and xylene (or their naphthenic equivalents) which constitute preferred gasoline blending stocks from both the octane and volatility standpoints.

When an aromatic saturation step is interposed between the hydrofining step and a hydrocracking step, particularly at lower hydrocracking temperatures, cyclic compounds present in the feed which contain 9 or more carbon atoms in the molecule are converted in large part to cyclic product compounds, principally naphthenes, which contain four less carbon atoms than the corresponding precursor compounds. Thus, in the case discussed above wherein a naphtha is employed as feed, the use of a sequence of hydrofining, aromatics saturation and low temperature hydrocracking steps can be expected to give a synthetic product which is relatively rich in $C_7$ and $C_8$ naphthenes. This sequence not only affords a substantial increase in the amounts of $C_4$ to $C_6$ paraffins produced during the hydrocracking step and a reduction in $C_1$ to $C_3$ paraffins, but also effects a qualitative change in that the ratio of iso to normal compounds in said paraffins is many times greater than that which is observed in processes omitting the aromatics saturation step.

The hydrocracked product obtained when an aromatics saturation step is used is very low in aromatic content. Accordingly, all portions of this product which boil in the proper range are well adapted to be used for jet and other non-gasoline fuel purposes.

Where the first zone is used for hydrofining followed by aromatics saturation, the feed is first subjected to a hydrofining treatment to reduce nitrogen content thereof, preferably to a level from 2 to 10 p.p.m. expressed as total nitrogen. This can be effected by contacting the feed, along with at least 500 s.c.f. of hydrogen per barrel thereof, with a sulfur-resistant hydrogenation catalyst at temperatures of from about 450° to 800° F., pressures of at least 300 p.s.i.g., and liquid hourly space velocities (LHSV) of from about 0.3 to 5. As is conventional in hydrofining operations having as their objective the removal of nitrogen-containing and sulfur-containing ingredients, the conditions of the hydrofining step are so chosen that saturation of aromatic components is generally limited, and so that little cracking of the feed takes place other than that of the nitrogen- and sulfur-containing compounds present. Any of the known sulfur-resistant hydrogenation catalysts may be used in the present process. The preferred catalysts of this category have as their main active ingredient one or more oxides or sulfides of the transition metals such as cobalt, molybdenum, nickel and tungsten, or of their reduced counterparts. These materials may be used in a variety of combinations with or without the use of various known stabilizers and promoters. Moreover, these catalysts may be employed either alone or in combination with various conventional supporting materials, such as charcoal, fuller's earth, kieselguhr, silica gel, alumina, bauxite or magnesia. A representative effective hydrofining catalyst for use in the present invention is one embodying an alumina support and containing molybdenum and/or tungsten in the sulfide or oxide form, in the amount of about 5 to 25% expressed as Mo or W, together with oxides or sulfides of cobalt and/or nickel, the latter materials being present in the amounts of from about 1 to 20%, expressed as Ni or Co.

The effluent obtained from the hydrofining step is treated, in accordance with methods presently known in the art, so as to remove ammonia and some hydrogen sulfide which may be present. A preferred removal method involves injecting water into the total effluent from the hydrofining unit and then passing the resulting mixture into a high pressure separator operating under such conditions of temperature and pressure (for example, 100° F. and 950 p.s.i.g.) that a gaseous overhead is removed that is predominantly hydrogen but which normally contains some hydrogen sulfide and light hydrocarbons. This overhead (following a clean-up treatment to remove any nitrogen and sulfur-containing compounds, if desired) can be recycled to the hydrofining unit along with make-up hydrogen. Two liquid phases are formed in the separator, an upper hydrocarbon phase and a lower aqueous phase which contains essentially all of the ammonia present and some hydrogen sulfide in the form of ammonium sulfide. The aqueous phase is removed from the system and discarded.

The hydrocarbon layer is then preferably passed into a stripper or distillation column from which any remaining hydrogen sulfide, ammonia and water are removed overhead.

In the aromatics saturation step, the portion of the hydrofined effluent to be hydrocracked is passed, along with added hydrogen, over a hydrogenation catalyst under elevated conditions of temeprature and pressure effective to saturate a substantial portion, preferably at least 50%, of the aromatic compounds present in the feed. Hydrogen is supplied along with the feed in an amount at least sufficient to effect said saturation, and preferably an excess of hydrogen is used so as to supply at least a portion of that required during the ensuing hydrocracking step, which is also consumptive of hydrogen. This permits the entire effluent from the saturation zone to be passed directly to the hyrocracking zone, if this method of processing is adopted. For most feed stocks, the dual requirements of aromatics saturation and of saturation of cracked products can be met by adding to the feed passed to the aromatics saturation zone at least 2000 s.c.f. of hydrogen per barrel of said feed, and preferably at least 3000 s.c.f. of hydrogen per barrel are so used.

The conditions employed in the aromatics saturation zone are generally similar to those employed in the hydrofining step except that here the temperatures employed are somewhat lower, being of the order of 200° to 700° F., with a preferred range being from 300° to 650° F. The catalyst used in this second stage may be a sulfur-active catalyst of the type used in the first, or hydrofining, stage, or it may consist of supported metals and/or metal oxides of Groups VI, VII and VIII elements of the Periodic System. Thus, Raney nickel can be employed, while other suitable catalysts comprise molybdenum oxide, platinum, palladium, rhodium, rhenium, nickel or cobalt and the like supported on alumina, silica gel, kieselguhr or other similar carriers of low cracking activity and high surface area. A preferred catalyst for use in effective aromatics saturation comprises one containing about 0.1 to 20% or more of metallic platinum supported on an alumina base. These catalysts may also contain from 0.1 to 2%, by weight, of halogen components such as fluorine or chlorine, thus including those platinum reforming and other catalysts of the type presently employed in catalytic reforming operations.

The saturated feed stocks produced as above are less refractory than those which have not been previously saturated, and thus can be hydrocracked at significantly lower temperatures than would otherwise be possible.

*Example 1*

In order to show the difference between the nature of the products obtained when hydrocracking an aromatic compound of representative molecular weight as compared with those obtained in a similar operation wherein the same compound is first saturated and then hydrocracked, hexamethylbenzene (nitrogen-free) was passed over a hydrocracking catalyst comprising nickel sulfide (3.6 weight percent nickel) on a synthetically-prepared silica-alumina support at an average temperature of 650° F., pressure of 1200 p.s.i.g. and an LHSV of 8.0, along with 6700 s.c.f. of hydrogen per barrel of feed. The per-pass conversion in this operation was 97.8% to products boiling below the initial boiling point of the feed compound. As shown by the data presented in Table I below, a large proportion of the feed was converted to $C_{10}$ and $C_{11}$ aromatic compounds.

A similar operation was then conducted using the corresponding saturated compound (hexamethylcyclohexane) as the starting compound. Here the nitrogen-free feed was passed at a pressure of 1185 p.s.i.g., a temperature of 550° F., and an LHSV of 8, along with 6533 s.c.f. of hydrogen per barrel of feed, over a hydrocracking catalyst containing nickel sulfide (6 weight percent nickel) on the synthetic silica-alumina cracking support. This catalyst was somewhat more active than that employed in the conversion of hexamethylbenzene, such activity being significant, as regards the data of comparative runs here being described, only in that it permitted temperatures to be reduced from 650° to 550° F. while maintaining other conditions, including per-pass conversion, substantially the same. The conversion in this operation was 99.8% per pass, and Table I below shows the product distribution obtained.

| Mols of Product per 100 Mols of Feed | Feed | |
|---|---|---|
| | Hexamethyl-benzene | Hexamethyl-cyclohexane |
| Methane | 10.3 | 0.14 |
| Ethane | 4.0 | 0.16 |
| Propane | 7.7 | 7.80 |
| Isobutane | 37.3 | 58.68 |
| n-Butane | 5.9 | 2.28 |
| Isopentane | 11.8 | 22.75 |
| n-Pentane | 1.4 | 0.39 |
| Isohexanes | 7.0 | 13.28 |
| n-Hexane | 0.5 | 0.23 |
| $C_6$-Naphthenes | 4.2 | 3.62 |
| $C_7$-Naphthenes | 8.8 | 17.86 |
| $C_8$-Naphthenes | 15.7 | 62.26 |
| $C_9$-Naphthenes | 8.4 | 3.71 |
| $C_{10}$-Naphthenes | 2.2 | None |
| $C_{11}$-Naphthenes | 0.8 | None |
| $C_{12}$-Naphthenes | 0.1 | None |
| Xylenes | 0.2 | None |
| Mesitylene | 0.9 | None |
| Pseudocumene | 3.4 | None |
| Hemimellitene | 0.7 | None |
| Durene, Isodurene | 21.2 | None |
| Prehnitene | 2.7 | None |
| $C_{10}$ Aromatic | 0.5 | None |
| Pentamethylbenzene | 19.3 | None |
| Hexamethylbenzene | 2.2 | None |

From the data of the above table, it is evident that saturation of an aromatic compound prior to hydrocracking the same enables the resulting naphthene to be hydrocracked in major portion to a naphthene containing 4 fewer carbon atoms than the feed compound. It will also be observed from said data that the saturated feed stock provides a much higher yield of the desired light isoparaffin compounds containing from 4 to 6 carbon atoms in the molecule, while at the same time effecting a corresponding reduction in the amounts of undesired lighter gases and normal $C_4$ to $C_6$ paraffins formed. In this latter connection, it is to be observed from the data of Table II given below, which derives from that shown in Table I, that the ratio of iso to normal components in the case of the saturated feed stock is many times higher than that obtained using hexamethylbenzene and is far above the iso to normal ratio as calculated from thermodynamic equilibrium considerations.

TABLE II

|  | Equilibrium Values | | Hexamethyl-benzene, 650° F. | Hexamethyl-cyclohexane, 550° F. |
|---|---|---|---|---|
|  | 550° F. | 650° F. | | |
| iC₄/nC₄ | 0.96 | 0.8 | 6 | 25.7 |
| iC₅/nC₅ | 2.9 | 2.3 | 9 | 58.3 |
| iC₆/nC₆* | 2.7 | 2.4 | 14 | 57.7 |

*Based on single-branched species, such being the type produced during the hydrocracking step.

*Example II*

In this operation there was employed as feed a catalytic cycle oil as obtained from a catalytic cracking unit operating with a California crude, said feed having the following specifications:

Gravity, ° API _____ 25.5
Aniline point, ° F. _____ 75
Sulfur, wt. percent _____ 0.98
Nitrogen, total p.p.m. _____ 900
Aromatics, vol. percent _____ 58
Olefins, vol. percent _____ 10
Paraffins+naphthenes, vol. percent _____ 32
ASTM distillation, D-158:
  Start _____ ° F__ 410
  10% _____ ° F__ 459
  50% _____ ° F__ 480
  90% _____ ° F__ 511
  End point _____ ° F__ 549

The foregoing feed was hydrofined by passing the same, along with 3000 s.c.f. of hydrogen per barrel of feed, at 720 p.s.i.g., 730° F., and 1.0 LHSV over a hydrofining catalyst comprising 10.4 weight percent molybdenum oxide and 3.6 weight percent cobalt oxide, the balance being alumina. The resulting material was thereafter treated so as to remove hydrogen, hydrogen sulfide, ammonia, other gases and water-soluble compounds, leaving a hydrofined stock having the following specifications:

Gravity, ° API _____ 29.5
Aniline point, ° F. _____ 86
Nitrogen content, total p.p.m. _____ 2.1
Aromatic content, vol. percent _____ 55
Paraffins, vol. percent _____ 12
Naphthenes, vol. percent _____ 33
ASTM distillation, D-158:
  Start _____ ° F__ 380
  10% _____ ° F__ 436
  50% _____ ° F__ 470
  90% _____ ° F__ 506
  End point _____ ° F__ 522

The above hydrofined stock was then split into two portions, with one portion being saturated and then hydrocracked, and the other portion being only hydrocracked. The first of these samples was hydrogenated by passing the same, along with 6500 s.c.f. of hydrogen per barrel of feed, over an alumina-supported platinum catalyst (0.75 weight percent platinum, 0.8 weight percent halogen) at 650° F., 1200 p.s.i.g. and 2.0 LHSV. This saturation operation, which entailed a hydrogen consumption of about 1100 s.c.f. per barrel of feed, yielded a product having the following inspections:

Gravity, ° API _____ 36.5
Aniline point, ° F. _____ 147
Paraffins+naphthenes, vol. percent _____ 90
Aromatics, vol. percent _____ 10
Freezing point, ° F. _____ −35
Smoke point, mm. _____ 21

The hydrogenated product was then hydrocracked by passing the same, along with 12,000 s.c.f. of hydrogen per barrel of feed, over a catalyst comprising nickel sulfide (2.6% Ni) on a synthetic silica (90%)-alumina cracking support, at an average temperature of 534° F., a pressure of 1200 p.s.i.g. and an LHSV of 1.1, under which conditions the conversion to product boiling below 360° F. was approximately 59 volume percent perpass. In this operation, the yields were as follows:

C₁, wt. percent _____ 0.0
C₂, wt. percent _____ 0.3
C₃, wt. percent _____ 0.9
iC₄, wt. percent _____ 6.3
nC₄, wt. percent _____ 0.7
C₅—180° F. cut, wt. percent _____ 9.9
180–360° F. cut, wt. percent _____ 42.7
360° F.+ _____ 40.3
Hydrogen consumption, s.c.f./bbl. of feed converted _____ 663

The 180–360° F. cut, which contained 4% aromatics, 77% naphthenes, and 19% paraffins represented a gasoline blending stock which could be upgraded to a leaded octane value of from 100 to 103 by passage through a catalytic reformer. The 360° F.+ cut represented a good jet stock blending component and had the following inspections:

Gravity, ° API _____ 41.1
Aniline point, ° F. _____ 152
Freezing point, ° F. _____ −31
Pour point, ° F. _____ −40
Smoke point, mm. _____ 24
Aromatic content, vol. percent _____ 5

When, in a companion operation, the same operation as described above was repeated, but using the catalyst of Example I and without the practice of a hydrogenation step, it was found that the temperature of the hydrocracking catalyst, other conditions remaining the same, had to be raised to approximately 569° F. to get a comparable per-pass conversion. The product yields in this operation were as follows:

C₁, wt. percent _____ 0.0
C₂, wt. percent _____ 0.8
C₃, wt. percent _____ 1.7
iC₄, wt. percent _____ 4.4
nC₄, wt. percent _____ 2.1
C₅—180° F. cut, wt. percent _____ 11.2
180–360° F. cut, wt. percent _____ 42.01
360° F.+ fraction, wt. percent _____ 40.1
Hydrogen consumption, s.c.f./bbl. of feed converted _____ 1423

It will be noted that the ratio of iC₄ to nC₄ products is far lower here than the value shown above in connection with the hydrogenated stock.

The inspections on the 360° F.+ portion of the product from the hydrocracking zone were as follows:

Gravity, ° API _____ 38.6
Aniline point, ° F. _____ 125
Composition, vol. percent:
  Paraffins+naphthenes _____ 71
  Aromatics _____ 29
Freezing point, ° F. _____ −27
Smoke point, mm. _____ 16

Due to its high content of aromatic components, this stock is not adapted for use as a jet fuel component.

*Example III*

In this operation, the feed employed was a catalytic cycle oil having the same specification as that described in Example II. Here the feed was hydrofined in two stages; in the first stage the feed was passed, along with 6000 s.c.f. of hydrogen per barrel of feed at 675° F. and 1.0 LHSV, over a catalyst comprising 25.4% molybdenum and 7.5% cobalt oxide on alumina. In the second stage, the operation of the first stage was repeated, but at 1.5 LHSV and a temperature of 685° F. Total hydrogen consumption was 500 s.c.f. per barrel of feed, and the hydrofined product had the following inspections:

| | |
|---|---|
| Gravity, ° API | 30.2 |
| Aniline point, ° F. | 90.0 |
| Composition, vol. percent: | |
| Paraffins+naphthenes | 49 |
| Aromatics | 51 |
| Total nitrogen, p.p.m. | 0.15 |
| ASTM distillation D-158: | |
| Start | ° F__ 324 |
| 10% | ° F__ 435 |
| 30% | ° F__ 455 |
| 50% | ° F__ 467 |
| 70% | ° F__ 482 |
| 90% | ° F__ 505 |
| End point | ° F__ 557 |

The hydrofined feed was then processed by alternative methods. In the first method the feed was hydrogenated and then hydrocracked. In the second, the feed was only hydrocracked. In both cases, the operation was one of extinction recycle, with all portions of the product from the hydrocracking unit boiling above 400° F. being recycled to said unit.

In the first method, the hydrofined feed was hydrogenated by passing the same, along with 6500 s.c.f. of hydrogen per barrel of feed, at 1200 p.s.i.g., 500° F. and 3.0 LHSV over a catalyst comprising 2.0 weight percent platinum on an activated alumina support, the hydrogen consumption in this operation being 1000 s.c.f. per barrel of feed. The hydrogenated product had the following inspections:

| | |
|---|---|
| Gravity, ° API | 37.2 |
| Aniline point, ° F. | 156.0 |
| Composition, vol. percent: | |
| Paraffins | 16 |
| Naphthenes | 84 |
| Aromatics | 0 |
| ASTM distillation D-158: | |
| Start | ° F__ 375 |
| 10% | ° F__ 414 |
| 30% | ° F__ 430 |
| 50% | ° F__ 445 |
| 70% | ° F__ 462 |
| 90% | ° F__ 495 |
| End point | ° F__ 539 |

The foregoing hydrogenated product was then hydrocracked by passing the same, along with 6500 s.c.f. of hydrogen per barrel of feed, at 1200 p.s.i.g., 479° F. and 0.8 LHSV, over a catalyst comprising nickel sulfide (6 weight percent nickel) on a synthetic silica-alumina cracking support containing about 90% silica, said support being in the shape of small beads (⅛″ diameter) and having a Cat. A value in excess of 40 at the time of being impregnated with the hydrogenating component and before being thereafter calcined and sulfided. Under these conditions, there was obtained a per-pass conversion of 62.3% to synthetic products boiling below 400° F. The weight percent yield of such products, based on the feed converted thereto, was as follows, it being noted that the operation was consumptive of 1670 s.c.f. of hydrogen per barrel of feed converted to synthetic product:

| | |
|---|---|
| $C_1$ | 0.0 |
| $C_2$ | 0.03 |
| $C_3$ | 0.8 |
| $iC_4$ | 9.4 |
| $nC_4$ | 0.7 |
| $C_5$—180° F. cut | 17.0 |
| 180—400° F. cut | 74.9 |

From the above data, it will be observed that the ratio of iso to normal $C_4$ product was extremely high, being 13.4. Moreover, losses to $C_1$–$C_3$ gases were insignificant.

The 180–400° F. cut referred to above had the following inspections:

| | |
|---|---|
| Gravity, ° API | 49.7 |
| Aniline point, ° F. | 137 |
| Composition, vol. percent: | |
| Paraffins | 22 |
| Naphthenes | 78 |
| ASTM distillation D-158: | |
| Start | ° F__ 221 |
| 10% | ° F__ 241 |
| 30% | ° F__ 268 |
| 50% | ° F__ 291 |
| 70% | ° F__ 333 |
| 90% | ° F__ 374 |
| End point | ° F__ 400 |

In the comparison run, made without the practice of the hydrogenation step, the hydrofined feed was hydrocracked at the same conditions as described above, except that, in order to obtain a 60% per-pass conversion to product boiling below 400° F., it was found to be necessary to raise the catalyst temperature from the value of 479° F. noted above to one of 555° F. Hydrogen consumption in this run was 1720 s.c.f. per barrel of converted feed, while the weight percent yield of synthetic product, based on converted feed, was as follows:

| | |
|---|---|
| $C_1$ | 0.0 |
| $C_2$ | 0.1 |
| $C_3$ | 2.6 |
| $iC_4$ | 8.1 |
| $nC_4$ | 3.1 |
| $C_5$—180° F. cut | 19.0 |
| 180—400° F. cut | 70.0 |

From the foregoing data, it will be noted that the hydrocracking operation conducted without preliminary hydrogenation resulted in considerably more light gas make. Moreover, the iso to normal $C_4$ ratio was but 2.6 instead of 13.4.

The 180°–400° F. cut had the following inspections, it being noted that due to relatively high aromatic content shown, this product would not be suitable for jet fuel blending process:

| | |
|---|---|
| Gravity, ° API | 47.1 |
| Aniline point, ° F. | 98 |
| Paraffins, vol. percent | 23 |
| Naphthenes, vol. percent | 56 |
| Aromatics, vol. percent | 21 |
| ASTM distillation D-158: | |
| Start | ° F__ 216 |
| 10% | ° F__ 238 |
| 30% | ° F__ 255 |
| 50% | ° F__ 281 |
| 70% | ° F__ 319 |
| 90% | ° F__ 361 |
| End point | ° F__ 408 |

*Example IV*

In this operation light catalytic cycle oil of California origin boiling over a range of 410° to 549° F. and containing 900 p.p.m. total nitrogen and 55 volume percent aromatics was hydrofined in the general manner shown in Example II to reduce the total nitrogen content to 2.1 p.p.m. The resulting product, along with 12,000 s.c.f. of hydrogen per barrel of feed, was then passed at a pressure of 1200 p.s.i.g. and an LHSV of 3.0, sequentially over two catalyst beds in series. The first of said beds contained the hydrogenating catalyst shown in Example II, and the feed stream was admitted thereto at a temperature of approximately 500° F. The total effluent stream from said bed, now at a temperature of approximately 670° F. due to the exothermic nature of the hydrogenation reaction taking place over the catalyst, was then passed over the catalyst in the second bed, said catalyst being a hydrocracking catalyst having the same composition as that of Example II. This operation was conducted once-through and resulted in a 59.7% per-pass conversion of the feed to synthetic product boiling below 360° F. Based on total feed to the reactor, a product stream was obtained having the following composition:

| | Wt. percent |
|---|---|
| $C_1$ | 0.0 |
| $C_2$ | 0.06 |
| $C_3$ | 1.3 |
| $iC_4$ | 6.7 |
| $nC_4$ | 1.4 |
| $C_5$—180° F. cut | 13.4 |
| 180–360° F. cut | 42.5 |
| 360° F.+cut | 38.1 |

The respective cuts shown above had the following inspections:

| | $C_5$–180° F. | 180–360° F. | 360° F.+ |
|---|---|---|---|
| Gravity, °API | 80.3 | 50.7 | 38.8 |
| Aniline Point, °F | | 121.5 | 149.5 |
| Composition, Vol. Percent: | | | |
| Paraffins+naphthenes | 99 | 92 | 88 |
| Aromatics | 1 | 8 | 12 |
| Freezing Point, °F | | | −26 |
| Smoke Point, mm | | | 21 |

*Example V*

In this operation a heavy catalytic cycle oil of California origin boiling from 380° to 783° F. and containing 900 p.p.m. total nitrogen was hydrofined to a nitrogen level of 0.2 p.p.m. by passage, at 745° F., 1200 p.s.i.g., and 1.3 LHSV, along with 5700 s.c.f. of hydrogen per barrel, over a catalyst comprising molybdena (19.1% Mo) and cobalt oxide (5.9% Co) on an alumina support. The hydrofined product had an aromatic content of 14 volume percent. The hydrofined feed was then hydrogenated by passing the same, at 1200 p.s.i.g., 500° F. and 3.0 LHSV, along with 6500 s.c.f. of hydrogen per barrel, over a catalyst comprising 2% platinum on alumina. In this hydrogenation step, which was consumptive of approximately 300 s.c.f. of hydrogen per barrel of feed, the feed was converted to an aromatics-free product.

The hydrogenated product was then hydrocracked by passage, along with 6500 s.c.f. of hydrogen per barrel, over the hydrocracking catalyst shown in Example III hereof at 1200 p.s.i.g., 480° F. and 0.8 LHSV. The portion of the effluent from the hydrocracking zone boiling above 525° F. was recycled to said zone, and the effluent portion boiling below 525° F., obtained in a per-pass yield of 57.7%, had the following composition:

| | Wt. percent |
|---|---|
| $C_1$ | 0.0 |
| $C_2$ | 0.05 |
| $C_3$ | 0.6 |
| $iC_4$ | 5.4 |
| $nC_4$ | 0.7 |
| $C_5$—180° F. cut | 10.6 |
| 180–360° F. cut | 39.6 |
| 360–525° F. cut | 44.4 |

The feed and the above cuts had the following inspections:

| | Feed | $C_5$–180° F. | 180–360° F. | 360–525° F. |
|---|---|---|---|---|
| Gravity, °API | 34.9 | 84.4 est. | 55.1 | 39.9 |
| Aniline Point, °F | 179 | | 142 | |
| Composition, Vol. Percent: | | | | |
| Paraffins | 24 | 79 | 32 | 29 |
| Naphthenes | 76 | 21 | 68 | 73 |
| Aromatics | 0 | 0 | 0 | 1 |
| Freezing Point, °F | | | | −20 |
| Smoke Point, mm | | | | 27 |

In addition to the advantages discussed above, it may also be observed that hydrogenating the feed prior to hydrocracking the same permits the hydrocracking zone to be operated at significantly lower pressures than would otherwise be the case, without any increase in the fouling rate. Thus, for example, it has been found that, by saturating the aromatics present therein, a typical catalytic cycle stock can be hydrocracked at pressures of from about 600 to 800 p.s.i.g. without raising the catalyst fouling rate over that otherwise obtained from pressures of about 1200 to 1500 p.s.i.g. in operations conducted without preliminary saturation of the aromatics in the feed prior to hydrocracking.

FEED TO SECOND ZONE

The statement of invention herein, and the foregoing discussion (including the discussion of the feed to the first zone, where used, the various possible interstage fractionation cut points and methods of product removal and recycle, nitrogen contents, aromatics saturation, etc.) are adequate, in connection with the following disclosure, to indicate to a man skilled in the art the nature of the second zone feed for various methods of operating the process of the present invention. It will be understood that it is within the contemplation of the present invention to add nitrogen to the second stage feed, or at any point in the process, as necessary to meet the requirements of the present invention.

SECOND ZONE CATALYST

The catalyst employed in the hydrocracking zone is an acidic material having hydrogenating characteristics and high cracking activity. It is made up of a hydrogenating component together with a material having a high degree of cracking activity either per se or when combined with the material employed to provide a hydrogenating component of the catalyst. In this connection, the term "high cracking activity" is employed herein to designate those catalysts having activity equivalent to a Cat. A value of at least 25 or a quinoline number of at least 20 (Journal Am. Chem. Society, 72, 1554 (1950)). In the case of catalysts not adapted to withstand the conditions employed in such tests, generally comparable, minimal cracking activity values can be determined by other methods known in the art.

Broadly speaking, the hydrogenating component of the catalyst may comprise one or more of the metals, and compounds of said metals, in Groups I(B), II(B), V, VI, VII and VIII of the Periodic Table. However, when, as in the preferred embodiment of the present invention, it is desired to provide a synthetic product fraction from the hydrocracking zone having a ratio of iso to normal paraffinic components which is far above the theoretical thermodynamic equilibrium values at the temperatures employed, the hydrogenating component of the catalyst is selected from one or more of the various compounds of metals falling within the aforesaid groups which are not readily reduced to the corresponding metal form under the reducing conditions prevailing in the hydrocracking zone. Thus, while the invention is operable with catalysts such as those comprising platinum or palladium or a compound such as nickel oxide or cobalt oxide which is readily reduced to the corresponding metal form in hydrocracking zone, it is preferred to use compounds not readily reduced such as an oxide or sulfide of molybdenum, tungsten, chromium, rhenium or zinc, or a sulfide of cobalt, nickel, copper, or cadmium; other hydrogenating materials falling within this preferred category are complexes of the various metals of the defined groups such, for example, as cobalt-chromium and nickel-chromium. Representative preparations of this character are described in U.S. Patent No. 2,899,287. If desired, more than one hydrogenating component may be present. The amount of the hydrogenating component may be varied within relatively wide limits of from about 0.1 to 35% or more, based on the weight of the entire catalyst composition.

The remaining, or cracking, component of the hydrocracking catalyst may be selected from a variety of solid materials of the type having good cracking activity. Among solid compositions which can be used are: (a) the various siliceous cracking catalysts; (b) catalysts wherein alumina and aluminum chloride are chemically bonded; (c) catalysts comprising fluorided magnesium oxide; and (d) aluminum chloride, particularly when contained within the pores of a support such as charcoal so as to reduce vaporization of the $AlCl_3$.

In general, it is preferred to employ a solid material as the cracking component of the catalyst. For example, there may be composites of silica-alumina, silica-magnesia, silica-alumina-zirconia, alumina-$BF_3$, other activated alumina combinations, acid-treated clays, synthetic metal aluminum silicates (including synthetic chabazites normally referred to as "molecular sieves") which have been found to impart the necessary degree of cracking activity to the catalyst. Particularly preferred catalyst components are synthetically-prepared silica-alumina compositions having a silica content in the range of from about 15 to 99% by weight, and an alumina content of 1% to 85% by weight. Fluorided or selenided supports may be used.

Particularly good results from the standpoint of high per-pass conversion, even at relatively low operating temperatures, coupled with high iso to normal ratios and the ability to withstand repeated regeneration with but relatively minor decreases in activity, are obtained with catalysts comprising a total of from about 0.1 to 35 weight percent of at least one compound selected from the group consisting of cobalt sulfide and nickel sulfide, said compounds being deposited on the aforementioned synthetically-prepared silica-alumina composites. The catalysts containing nickel sulfide have an exceptionally high activity.

The following hydrocracking catalysts are representative of those which are adapted to be used in a practice of the present invention, the support in each case being a synthetically-prepared silica-alumina composite containing about 87 to 90% silica and having a Cat. A value of 46.

Nickel sulfide (3.6% Ni) on silica-alumina: This catalyst was prepared by impregnating 11 liters of a crushed silica-alumina aggregate with 2896.9 grams of

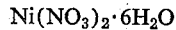

$$Ni(NO_3)_2 \cdot 6H_2O$$

dissolved in enough water to make 8800 milliliters' total solution, following which the beads were held for 24 hours at 70° F. The catalyst was then dried for 10 hours at 250° F. and thereafter calcined at 1000° F. for 10 hours. The calcined material was reduced in an atmosphere of hydrogen at 580° F. and 1200 p.s.i.g., following which the resulting nickel-bearing catalyst was sulfided in an atmosphere containing 8% $H_2S$ in hydrogen at 1200 p.s.i.g. and 580° F., thereby converting essentially all the nickel to nickel sulfide.

Nickel sulfide (2.5% Ni) on silica-alumina: This catalyst was prepared by impregnating 11 liters of a crushed silica-alumina aggregate with a solution prepared by mixing 1500 milliliters water and 500 milliliters ammonium hydroxide solution with 1082 grams of ethylenediamine tetraacetic acid (EDTA) and 469 grams of nickel carbonate, the solution being made up to a total of 4000 milliliters with water. The impregnated material was held for a period of 24 hours at 70° F., following which it was centrifuged and calcined for 10 hours at 1000° F. in air to convert the nickel chelate to nickel oxide. The catalyst was then reduced in an atmosphere of hydrogen at 650° F. and 1200 p.s.i.g., and sulfided in situ in the reactor by the use of a feed stream made up of a catalytic cycle oil (49 volume percent aromatics) to which 0.1% by volume of dimethyl disulfide had been added, at a pressure of 1200 p.s.i.g., and in the presence of approximately 6500 s.c.f. of hydrogen per barrel of feed.

Nickel sulfide (2.5% Ni) on silica-alumina: This catalyst was prepared by impregnating approximately 7.5 liters of a crushed silica-alumina aggregate which had been dried in air for 24 hours at 400° F., with 2183.7 grams of $Ni(NO_3)_2 \cdot 6H_2O$ dissolved in water and made up to a total of 7760 milliliters. The impregnated base material was then held for 24 hours at 70° F. and calcined for 10 hours at 1000° F. The catalyst was then sulfided by treatment in an atmosphere of hydrogen containing 8% hydrogen sulfide at 1200 p.s.i.g. and 580° F.

Cobalt sulfide (4% Co) on silica-alumina: This catalyst was prepared by impregnating 2000 milliliters of a crushed silica-alumina aggregate with 1500 milliliters of an aqueous solution containing 172.5 milliliters ammonium hydroxide solution and 373 grams of EDTA along with 168 grams cobalt carbonate, the solution being heated until bubbling ceased before being added to the silica-alumina material which, in turn, had previously been dried for 24 hours at 400° F. Following impregnation, the catalyst was centrifuged and calcined for 4 hours at 1000° F., thus yielding a material having an amount of cobalt oxide equivalent to 2.2 weight percent cobalt. A second impregnating solution was then made up as above, using 150.2 grams cobalt carbonate, 334 grams EDTA and 154 milliliters of ammonium hydroxide, and added to the catalyst. Following a holding period of 24 hours at 70° F., the catalyst was centrifuged and calcined for 10 hours at 1000° F. The calcined product so obtained was then alternately reduced in hydrogen and oxidized in air (repeating the cycle 5 times) at 1000° F. and 1200 p.s.i.g. The catalyst was then sulfided by treatment with an excess of a mixture comprising 10% by volume of dimethyl disulfide in mixed hexanes at 1200 p.s.i.g. and 675° F., hydrogen also being present in the amount of about 6500 s.c.f. per barrel of feed.

Cobalt sulfide (2% Co) and chromium sulfide (3.53% Cr) on silica-alumina: This catalyst was prepared by forming an aqueous slurry with 1130 grams of the chelate of chromium and EDTA, to which slurry was added 196 grams of cobalt carbonate, the solution being then stirred until bubbling action ceased and made up to 1779 milliliters with water. This solution was warmed to 140° F. and added to 2280 milliliters of the crushed silica-alumina aggregate. The resulting material was then held for 24 hours at 140° F., following which it was centrifuged and calcined 10 hours at 1000° F. The calcined product was reduced in an atmosphere of hydrogen at 1200 p.s.i.g. and 675° F. following which the cobalt and chromium metals present were converted to sulfides by treatment with an excess of a solution comprising 10% by volume of dimethyl disulfide in mixed hexanes at 1200 p.s.i.g. and 675° F., hydrogen also being present in the amount of 6500 s.c.f per barrel of feed.

Molybdenum sulfide (2% Mo) on silica-alumina: This catalyst was prepared by forming 530 milliliters of an ammoniacal solution containing 41.4 grams of ammonium molybdate. This solution was then added to the crushed silica-alumina aggregate, previously dried for 24 hours at 400° F., in an amount sufficient to yield a dried product containing the equivalent of 2 weight percent molybdenum. After being held for 24 hours at 70° F., the impregnated material was centrifuged and calcined for 5 hours at 1000° F. It was then reduced in an atmosphere of hydrogen at 1200 p.s.i.g. and 650° F., following which it was sulfided in situ by treatment under these same conditions of temperature and hydrogen pressure with a hydrofined cycle oil (49% aromatics) containing 1% by volume dimethyl disulfide.

Nickel sulfide (1% Ni) and molybdenum sulfide (1% Mo) on silica-alumina: This catalyst was prepared in the following manner: 28.6 milliliters of ammonia were mixed with 80 milliliters water and added to 49.3 grams EDTA, and to this solution was added 22.3 grams of nickel carbonate. After being heated to evolve carbon dioxide, this solution was mixed with another solution prepared by dissolving 78.7 grams of ammonium molybdate in a mixture of 80 milliliters of ammonia hydroxide and 80 milliliters of water. The resulting solution, on being made up to 480 milliliters by the addition of water, was then used to impregnate 600 milliliters of the crushed silica-alumina aggregate. The impregnated material, after being held for 24 hours at 70° F., was centrifuged and calcined for a period of 10 hours at 1000° F. It was then reduced in an atmosphere of hydrogen at 1200 p.s.i.g. and 650° F. following which it was sulfided under these same conditions of temperature and hydrogen pressure with a solution containing 10 volume percent dimethyl disulfide in mixed hexanes.

SECOND ZONE OPERATION

A very desirable method of operating the second zone is to recycle to that zone a hydrogen-rich gas stream from which ammonia has been removed. As discussed above, various hydrocarbon fractions may be recycled to the second zone. The product fractions from the second zone that boil below the initial boiling point of the feed constitute excellent gasoline blending stocks for certain purposes; however, where they are desired for gasoline purposes, it will generally be found more desirable to send at least the heavier portions of them to a catalytic reformer where they will serve as a most excellent preferred feed for catalytic reforming operations.

The second zone is supplied with at least 1500 s.c.f. of hydrogen per barrel of feed thereto. At least 500, and normally from about 1000 to 2000, s.c.f. of hydrogen are consumed in the second zone per barrel of feed thereto that is converted to synthetic products, i.e., products boiling below the initial boiling point of the feed thereto.

Operating conditions in the second zone will include a temperature of 450° to 950° F., preferably 500° to 850° F., a liquid hourly space velocity of 0.2 to 5.0, preferably 0.4 to 3.0, and a hydrogen partial pressure of at least 350 p.s.i.g., and preferably not more than 3000 p.s.i.g., and still more preferably 500 to 2000 p.s.i.g. In the second zone, there is converted at least 20 volume percent per pass of the feed thereto to products boiling below the initial boiling point of said feed.

While some nitrogen can be tolerated in the second zone, as discussed above, nitrogen, except as necessary to suppress aromatics saturation in the second zone according to the present invention, is an undesirable ingredient of the feed to the second zone and should be kept within the aforementioned limits.

FIGURE 2

Referring now to FIG. 2, there shown is a graphical representation of hydrocracking catalyst metal crystallite sizes at various times after the second zone catalyst has been on stream in hydrocracking service with various hydrocarbon feeds and various hydrocarbon feed contaminants. The following run numbers correspond with the numbers shown in FIG. 2, and each run was conducted under the second stage operating conditions referred to elsewhere herein. In each run, the second zone feeds shown contained substantially no sulfur or nitrogen other than as indicated.

| Run No. | Feed |
|---|---|
| 1 | Hydrobate (hydrogenated). |
| 2 | Light Cycle Oil, unhydrogenated. |
| 3 | Do. |
| 4 | Light Cycle Oil, unhydrogenated, high space velocity. |
| 5 | Light Coker Distillate, unhydrogenated. |
| 6 | Light Cycle Oil, unhydrogenated, with 500 p.p.m. S. |
| 7T | Light Cycle Oil, unhydrogenated. |
| 7B | Light Cycle Oil, hydrogenated. |
| 8 | Light Cycle Oil, unhydrogenated. |
| 9 | Hydrobate (hydrogenated). |
| 10 | Light Cycle Oil, unhydrogenated. |
| 11 | Do. |
| 12 | Light Cycle Oil, hydrogenated. |
| 13 | Light Cycle Oil, partially hydrogenated, with 60 p.p.m. N and 0.07 weight percent S. |
| 14T | Light Cycle Oil, unhydrogoenated. |
| 14B | Light Cycle Oil, hydrogenated. |
| 15 | Light Cycle Oil, unhydrogenated, with S, no N. |
| 16 | Cycle Oil Mixture, hydrogenated, no S and no N. |
| 17 | Cycle Oil, unhydrogenated, 5-20 p.p.m. N. |

From FIG. 2 and the runs indicated thereon, it may be seen that sulfur has been shown to have no effect on the growth of metal crystallites on the hydrocracking catalyst, and that both the presence of nitrogen in the feed to the hydrocracking zone and the presaturation of aromatics in the feed to the hydrocracking zone affect the growth of the metal crystallites. This is a remarkable discovery from several standpoints; nitrogen heretofore has been thought to be a severe catalyst poison for hydrocracking catalysts, and hydrogenation prior to a hydrocracking step heretofore has been thought to be a somewhat futile operation, particularly inasmuch as the reactions occurring in the hydrocracking zone consumed hydrogen and any desired aromatics saturation could be accomplished in that zone.

Runs 7T and 7B, and runs 14T and 14B on FIG. 2 are particularly interesting; run 7B was made with exactly the same feed and under exactly the same conditions as run 7T, except that the feed in run 7B was hydrogenated whereas the feed in run 7T was not. Exactly the same distinction applies to runs 14T and 14B.

The hydrobate feeds referred to in connection with FIG. 2 do contain aromatics; however, they are mainly alkyl benzenes, which do not hydrogenate to any great extent under the hydrocracking conditions in the second zone. The aromatics which do hydrogenate readily under the hydrocracking conditions of the second zone, and which, when hydrogenated in the presence of a hydrocracking catalyst, appear to cause rapid growth of metal crystallites on such a catalyst, are polynuclear aromatics. Accordingly, it is highly important for purposes of the present invention to suppress the hydrogenation of polynuclear aromatics in the presence of a hydrocracking catalyst, whether or not a prior hydrofining, hydrocracking or presaturation step is included in the process. FIG. 2 indicates clearly that such suppression may be obtained by presaturation of aromatics and/or by the presence of nitrogen in the feed to the hydrocracking zone under consideration.

FIGURE 3

Referring now to FIG. 3, there shown is a graphical representation of operating temperature versus time on-stream when hydrocracking a particular feed containing 60 p.p.m. nitrogen and 0.07 weight percent sulfur at relatively constant conversion.

It has been shown heretofore in connection with FIG. 2 that sulfur has no effect upon the growth of metal crystallites on the hydrocracking catalyst when the catalyst is in service. Accordingly, the sulfur content of the light cycle oil referred to in FIG. 3 is immaterial. The material factors are that the light cycle oil is partially hydrogenated and contains 60 p.p.m. nitrogen.

FIG. 3 in fact involves the same catalyst and feed that were used in run 13 in connection with FIG. 2. It will be noted from FIG. 3 that the activity of the fresh catalyst when it went on-stream at 50% conversion was such that a starting temperature of only about 740° F. was necessary in order to maintain that conversion, and that when operation was raised to 60% conversion a temperature of about 760° F. was necessary. The catalyst was regenerated after about 2350 hours on-stream, when the temperature necessary to maintain 60% conversion had reached approximately 900° F. The catalyst was then placed back on-stream and, as shown in FIG. 3, the activity of the regenerated catalyst was such that it could accomplish 60% conversion of the feed at a temperature of about 750° F., i.e., its activity was substantially as high as when it was fresh, as shown by the fact that in each case it could accomplish the same conversion in substantially the same temperature. From FIG. 3, it may be seen that, following regeneration, the catalyst was capable of continuing to accomplish 60% of the conversion of the feed for approximately an additional 1500 hours before reaching a temperature of 900° F.

In contrast with the catalyst of FIG. 3, which had been in service with a partially hydrogenated nitrogen-containing light cycle oil, the following table indicates relative activities obtained after similar regenerations of other catalysts that had been in service with feeds that had not been hydrogenated and that did not contain nitrogen.

REGENERATED CATALYST ACTIVITIES OF NICKEL SULFIDE ON SILICA-ALUMINA HAVING AN ORIGINAL ACTIVITY OF 20

| Catalyst: | Regenerated activity |
|---|---|
| 1 | 5.0 |
| 2 | 5.0 |
| 3 | 5.7 |
| 4 | 7.7 |
| 5 | 9.2 |

In comparison with the catalysts in the above table, the catalyst of FIG. 3 had a fresh activity of 20 and its activity upon regeneration was restored to 20.

The regeneration procedure used in the foregoing examples, which is satisfactory for purposes of the present invention, involved a conventional treatment of the spent catalyst in a mixture of nitrogen and air at an elevated temperature of between 800° and 1000° F. for from about 24 to 80 hours. The nitrogen-air mixture contained from about ½% to about 2% oxygen with the remainder nitrogen. An especially preferred regeneration procedure for purposes of the present invention involves the foregoing conventional regeneration, followed by a high temperature treatment at from about 1200° to 1600° F., in the presence of a dry nonreducing gas for a period of from about 0.25 to 48 hours, followed by a sulfiding treatment prior to placing the catalyst back on stream.

In a variation of the aforesaid especially preferred regeneration procedure, after the conventional treatment in nitrogen and air, and before the high temperature treatment, the catalyst is reduced in flowing hydrogen in rising temperature increments, which may be increments of from about 50° to 250° F., starting at from about 450° F. and ending at about 900° to 1000° F. The temperature is held at each level for from about 0.5 to several hours until the exothermic reduction reaction attributable to the new temperature is indicated by thermocouple measurements to be completed throughout the catalyst bed. The objective in such an incremental reduction procedure is to keep the partial pressure of water at a minimal level; this because various compounds in the catalyst or various parts of the catalyst do not all reduce at the same temperature, the water created upon reduction of one portion of the catalyst at one temperature level can be removed before additional water is created by reduction of another portion of the catalyst. Following this incremental reduction procedure, the catalyst may be re-oxidized and subjected to the aforesaid high temperature non-reduction and sulfiding treatments previously discussed.

The aforesaid incremental reduction procedure also may be used to advantage in connection with new catalyst preparation, in addition to being used in connection with regeneration of used catalysts. In the case of new catalyst preparation, the procedure is used following the calcining step in the catalyst preparation. Thereafter, the catalyst may be re-oxidized and subjected to the aforesaid high temperature reduction and sulfiding treatments previously discussed.

The following comparative table directionally indicates the effect, on aromatics content of the synthetic product of a hydrocracking process, that is caused by the presence of nitrogen in the feed. In each case, the catalyst comprises a Group VIII metal on a silica-alumina cracking support, and in each case, the comparison was made at a mid-run temperature of about 820° F.

| | High N Feed (Partially Hydrofined) | Low N Feed (Hydrofined) |
|---|---|---|
| A. Light Cycle Oil: | | |
| Nitrogen in feed, p.p.m | 60 | 0.2 |
| Operating pressure, p.s.i.g | 1,800 | 1,200 |
| Liquid Volume Percent Aromatics, based on 180-400° F. product | 32.8 | 25 |
| Octane No. 180-400° F. fraction | 78 | 73 |
| B. Arabian Gas Oil: | | |
| Nitrogen in feed, p.p.m | 600 | 0.5 |
| Operating pressure, p.s.i.g | 2,000 | 1,200 |
| Liquid Volume Percent Aromatics, based on 180-400° F. product | 16.9 | 8.2 |
| Octane No. 180-400° F. fraction | 64.4 | 47.6 |

TYPE OF BED OPERATION

The second stage of the process of the present invention may be operated with a fixed catalyst bed, with a slurry-catalyst system, or with a fluidized catalyst system. In the slurry type of operation, a slurry of catalyst and charge is passed through the reactor, and the catalyst is separated from the slurry effluent and returned to the catalyst-slurry charge to the reactor. The fluidized type of operation, for example a transfer line cracking type of operation, may be used in conjunction with a fluidized catalyst regeneration procedure wherein a portion of the fluidized catalyst is continuously withdrawn from the catalyst inventory in cracking service, regenerated, and returned to the system.

COMBINATIONS WITH OTHER CONVERSION PROCESSES

As discussed above in connection with FIG. 1, there may be withdrawn from the system through lines 33 and 49 either net product streams or feed streams for catalytic cracking. A particularly excellent catalytic feed stock is so obtained when a heavy gas oil or heavy cycle oil feed is supplied to the first zone, and the 650° F. and heavier portions of the effluent therefrom are sent to catalytic cracking. Any naphtha stream removed from the system during the practice of the present invention is an excellent reformer feed stock.

CONCLUSION

From the foregoing, it may be seen that the novel methods of the present invention are effective in providing a large degree of operational flexibility in the type of hydrocracking process to which the invention relates, and are effective in accomplishing the production of superior products, including naphthas, heating oils, diesel fuels and jet fuels, while maintaining the hydrocracking catalyst at a high level of activity and in a regenerable condition for long on-stream periods.

Although only specific arrangements and modes of operation of the present invention have been described and illustrated, numerous changes could be made in these arrangements and modes without departing from the spirit of the invention, and all such changes that fall within the scope of the appended claims are intended to be embraced thereby.

We claim:

1. In a process for converting a hydrocarbon feed selected from the group consisting of hydrocarbon distillates boiling from 500°–1100° F. and hydrocarbon residua boiling above 1050° F. which comprises contacting said feed in a hydrocracking zone with a nickel-containing hydrocracking catalyst at a temperature of about 450°–850° F., a space velocity from about 0.2 to 5.0, and a hydrogen partial pressure of at least 350 p.s.i.g., the method of suppressing the rate of growth of nickel crystallites on said catalyst for the purpose of maintaining said catalyst in a regenerable condition, which comprises maintaining the polynuclear aromatics content of said feed at not more than about 20 volume percent; correlating the aromatics of said feed, the nitrogen content of said feed, said space velocity and said pressure at the operating temperature so that substantially all of the hydrogen consumed in said hydrocracking zone is consumed in hydrocracking reactions and the amount of hydrogen consumed in saturating aromatics is minimized; continuously operating said hydrocracking zone for at least one extended on-stream period of at least 750 hours; regenerating said catalyst; and using the regenerated catalyst in hydrocracking service for at least one additional extended on-stream period of at least 750 hours.

2. A process as in claim 1, with the additional step of saturating aromatics in said feed in a hydrogenation step preceding the hydrocracking step.

3. A process as in claim 1, wherein the feed to said hydrocracking zone contains at least 2 p.p.m. nitrogen.

4. A process as in claim 1, wherein the polynuclear aromatics content of said feed is below 5 volume percent.

5. A process as in claim 1, wherein said catalyst is regenerated to an activity of at least substantially all of its original fresh activity.

6. A process as in claim 1, wherein following said regeneration the regenerated catalyst is treated at from 1200° to 1600° F. in the presence of a dry non-reducing gas.

References Cited in the file of this patent

UNITED STATES PATENTS

| | | |
|---|---|---|
| 2,602,773 | McKinley et al. | July 8, 1952 |
| 3,008,895 | Hansford et al. | Nov. 14, 1961 |
| 3,023,159 | Ciapetta et al. | Feb. 27, 1962 |
| 3,043,769 | Nathan et al. | July 10, 1962 |